(12) United States Patent
Wade, III

(10) Patent No.: US 6,276,832 B1
(45) Date of Patent: Aug. 21, 2001

(54) COLLAPSIBLE BEARING RETAINER

(75) Inventor: Clifton Wade, III, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/409,035

(22) Filed: Sep. 29, 1999

(51) Int. Cl.[7] ................................................ F16C 23/04
(52) U.S. Cl. ......................... 384/204; 384/210; 384/903
(58) Field of Search ................................ 384/202, 203, 384/204, 210, 295, 537, 561, 903; 310/90

(56) References Cited

U.S. PATENT DOCUMENTS

| | | | |
|---|---|---|---|
| 2,911,855 | * 11/1959 | Opocensky | 384/537 X |
| 3,483,888 | * 12/1969 | Wurzel | 384/203 X |
| 4,806,025 | * 2/1989 | Kamiyama et al. | 384/202 |
| 4,910,424 | 3/1990 | Borcherding | 310/90 |
| 5,277,500 | * 1/1994 | Keck | 384/204 |
| 5,326,178 | * 7/1994 | Strobl | 384/192 |
| 5,360,274 | * 11/1994 | Strobl | 384/192 |
| 5,677,584 | * 10/1997 | Keck | 384/204 X |

* cited by examiner

Primary Examiner—Thomas R. Hannon
(74) Attorney, Agent, or Firm—Howell & Haferkamp LC

(57) ABSTRACT

A bearing retainer ring having a compliant tab is mounted on a motor shaft between a C-ring mounted on the shaft and one or more washers and a bearing mounted on the shaft. After completion of the construction of the electric motor, the shaft is loaded axially, deforming the projecting tab and providing axial end play between the bearing and its adjacent washer.

17 Claims, 2 Drawing Sheets

COLLAPSIBLE BEARING RETAINER

BACKGROUND OF THE INVENTION

(1) Field of the Invention

The present invention pertains to a collapsible bearing retainer that holds a bearing in place on a shaft of an electromagnetic device and its method of use. More specifically, the present invention pertains to a bearing retainer having compliant tabs that project axially from the retainer, where the tabs are deformed after assembling the retainer between a C-ring and several washers and a bearing on the shaft to ensure end play between the washers and the bearing.

(2) Description of the Related Art

An example of a prior art bearing retainer and its method of use are depicted in FIGS. 1–3. Bearing retainers of this type are often used on shafts of electromagnetic devices, such as electric motors. The prior art bearing retainer 10 of FIGS. 1–3 is also shown mounted on a shaft 12 of an electric motor. However, it should be understood that the bearing retainer 10 of the prior art is employed in other applications. It should also be understood that the bearing retainer of the invention yet to be described may be employed in applications other than the environment to be described.

Referring to FIG. 1, the internal windings (not shown) of the motor are to the left and the exterior of the motor is to the right. The shaft 12 is shown extending through a shaft opening 14 in an end bell or housing wall 16 of the motor. The dashed line 18 denotes the center axis of the shaft 12. The shaft 12 is provided with an annular groove 20 around its exterior surface. A C-ring 22 is mounted on the exterior of the shaft and engages in the annular groove 20, thereby providing an axially fixed stop on the shaft. The prior art bearing retainer 10 is next mounted on the shaft and moved into abutment against the C-ring 22 as shown in FIG. 1. A rubber washer 24, a phenolic washer 26 and a metal washer 28 are then mounted in succession on the shaft. The bearing 30 is next mounted on the shaft in its position shown in FIG. 1. The bearing 30 shown in the drawings is a spherical sintered powdered metal bearing however, other types of bearings may be mounted and retained on the shaft by employing the bearing retainer of the invention yet to be described.

In FIGS. 1–3, it is seen that the prior art bearing retainer 10 has a center hole 32 that is generally circular and is defined by a generally circular inner edge 34 of the retainer. The inner edge 34 of the retainer has an inner diameter that is only slightly larger than the exterior diameter of the shaft 12. This enables the bearing retainer 10 to slide easily over the exterior of the shaft to its position shown in FIG. 1. Also, the inner diameter of the bearing center hole 32 is slightly smaller than the exterior diameter of the C-ring 22 when the C-ring is mounted on the annular groove 20 of the shaft. This prevents the retainer from moving past the C-ring when an axial force directed to the left as viewed in FIG. 1 is exerted on the retainer. From the inner edge 34, the bearing retainer has a circular ring portion 36 that has axially opposite planar surfaces that extend radially outwardly to an annular flange 38 of the retainer. The annular flange 38 extends completely around the retainer and provides additional strength to the retainer. As can be seen in FIG. 1, the interior diameter of the annular flange 38 is determined so that the flange will engage over the exterior perimeter of the rubber washer 24. The annular flange 38 is turned outwardly at the exterior perimeter edge 40 of the bearing retainer. The prior art bearing retainer is also provided with a key projection 42 that is bent axially outwardly from the inner edge 34 of the retainer.

The motor shaft, with the bearing 30, the washers 24, 26, 28, the bearing retainer 10 and the C-ring 22 mounted thereon, is then assembled into the housing enclosure for the motor. Many motor housing enclosures have two end shields or end bells that are assembled together over opposite ends of the shaft. Although only one bearing assembly is shown in FIG. 1, there could be a like bearing assembly mounted on the opposite end of the shaft or some other type of bearing assembly supporting the opposite end of the shaft. For simplicity only one bearing assembly is described here. In assembling the two motor housing portions or the two end bells of the motor together, an axial force is exerted by the end bell 16 on the bearing 30. In one method of construction, the assembler pushes the two end bells together thereby creating the axial force exerted by the end bell 16 on the bearing 30. Depending on the particular motor construction and the assembling of the motor, the axial force could press the bearing 30, the washers 24, 26, 28, the bearing retainer 10 and C-ring 22 tightly together. Many prior art motor enclosures for smaller electric motors have their two end bells secured together by epoxy. The epoxy is later cured in an oven. As the epoxy cures, it shrinks to a certain extent, thereby further increasing the axial load or axial force on the bearing 30, the washers 24, 26, 28, the bearing retainer 10 and the C-ring 22.

The manual assembly of the motor and the shrinkage of the epoxy as it is oven cured could have a detrimental effect of creating an undesirable negative end play or no end play between the component parts of the bearing assembly. That is, the axial forces exerted by the motor end bell 16 on the bearing 30, the washers 24, 26, 28, the bearing retainer 10 and C-ring 22 cause these component parts to be pressed together with there being no end play or no axial spacing between adjacent parts. This situation can create friction between the metal washer 28 and the bearing 30 when the motor is operated. This friction, in turn, generates heat which can produce an undesirable burning smell when the motor is operated. This is particularly undesirable when the electric motor is used in a household appliance such as a dishwasher, clothes washer or clothes dryer.

What is needed to overcome the problem of friction heating of the prior art bearing is a way of retaining the bearing on the end of the shaft while ensuring a certain amount of end play between the bearing and the metal washer after the assembly of the electric motor is completed.

SUMMARY OF THE INVENTION

The present invention provides a bearing retainer that overcomes the disadvantages of the prior art bearing assembly discussed above by ensuring that a range of end play, preferably between 0.010 and 0.015 inches, is provided between the bearing and washer after the assembly of the motor has been completed.

The bearing retainer of the invention is designed to be employed in the same operative environment as the prior art bearing retainer and is employed in lieu of the prior art bearing retainer. The bearing retainer of the invention is positioned on the shaft between the C-ring 22, and the washers 24, 26, 28 and bearing 30. However, the bearing retainer of the invention differs from the prior art bearing retainer in certain aspects of its construction.

The bearing retainer of the invention is also preferably stamped from metal in a circular ring configuration. The bearing has a circular outer perimeter edge and a generally circular inner edge. However, the circular inner edge of the bearing retainer ring that defines its center hole is interrupted by several pairs of notches that extend radially through the material of the bearing retainer ring from the center hole. These pairs of notches define tabs between the notches of each pair. In the preferred embodiment, three tabs are formed in this manner. The tabs project radially inwardly toward the center hole of the bearing and terminate at distal edges. Each of the tabs is bent so that it angles slightly out of the plane of the bearing ring as it extends radially inwardly toward the center hole. In the preferred embodiment, the angled orientation of the tabs spaces the distal ends of the tabs from 0.010 inches to 0.015 inches from the plane of the notches or the plane of the bearing retainer ring.

The bearing retainer is assembled onto the motor shaft in much the same manner as the prior art bearing retainer. However, the tabs formed in the bearing retainer are positioned so that they engage with the C-ring mounted on the shaft when the bearing retainer is assembled to the shaft. Following assembly of the bearing retainer on the shaft, the washers are then assembled onto the shaft followed by the bearing.

The assembly of the shaft into the housing sections or end bells of the motor then takes place in the same manner as was done in assembling prior art motors. Again, the assembler exerts an axial force on the two housing halves or two end bells of the motor enclosure urging them toward each other. This presses the bearing, the washers and the bearing retainer between one of the housing end bells and the C-ring mounted on the shaft in the same manner as was done in the prior art assembly of the motor. The motor halves are then epoxied and the epoxy is cured completing the assembly of the motor.

At this point in the assembly of the motor, it is possible that there could be negative end play or no end play between the bearing, the washers, the bearing retainer and the C-ring. However, the construction of the bearing retainer of the invention enables a subsequent step to the assembly of the motor to ensure that there is end play between these component parts. The motor, upon completion of its assembly, is positioned on end so that its shaft center axis extends vertically. A load of 250 lbs. is then exerted on the end of the shaft. The load causes the compliant tabs formed in the bearing retainer to be bent from their angled orientations back into the plane of the bearing retainer ring and the ring notches. Because the angled orientation of the tabs positions their distal ends from 0.010 inches to 0.015 inches out of the plane of the retainer ring and the plane of the ring notches, exerting the axial load on the shaft that forces the bearing tabs back into the plane creates an end play in the component parts of the bearing assembly of from 0.010 inches to 0.015 inches. In this manner, the bearing retainer of the invention ensures that there will always be end play between the component parts of the bearing assembly regardless of how the motor shaft is assembled into the end bells or housing sections of the motor.

DESCRIPTION OF THE DRAWINGS

Further objects and features of the present invention will be revealed in the following detailed description of the invention and its method of use and in the following drawing figures, wherein.

DETAILED DESCRIPTION OF THE PREFERRED EMBODIMENT

Figure 1:
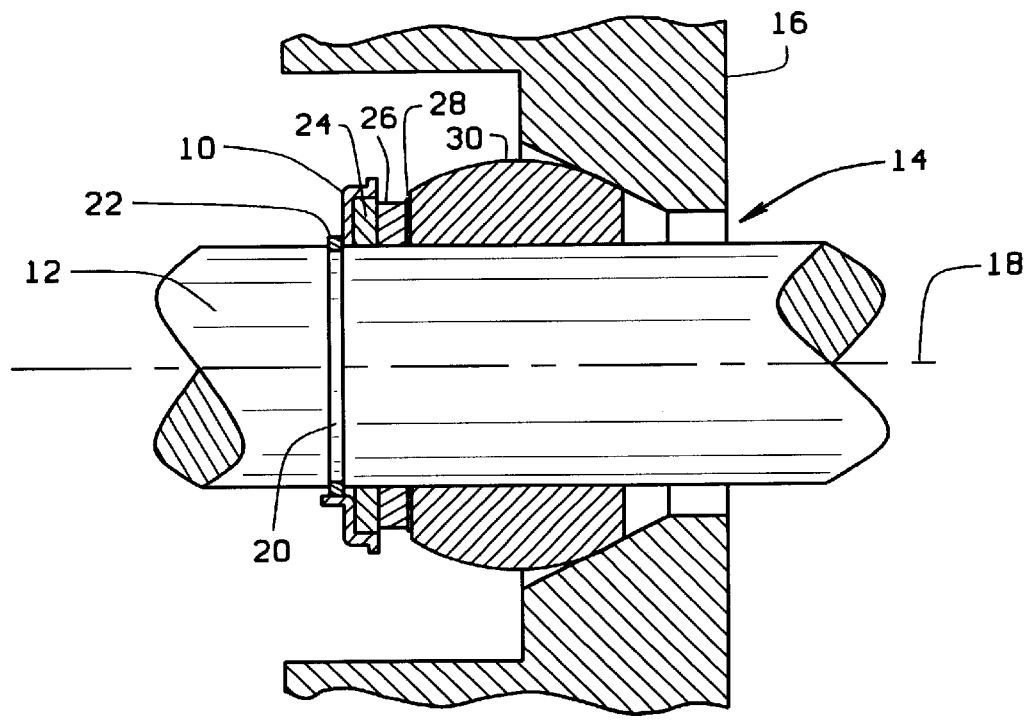
FIG. 1 is a partial side view, in section, of a prior art bearing assembly employing a bearing retainer.
Figure 2:
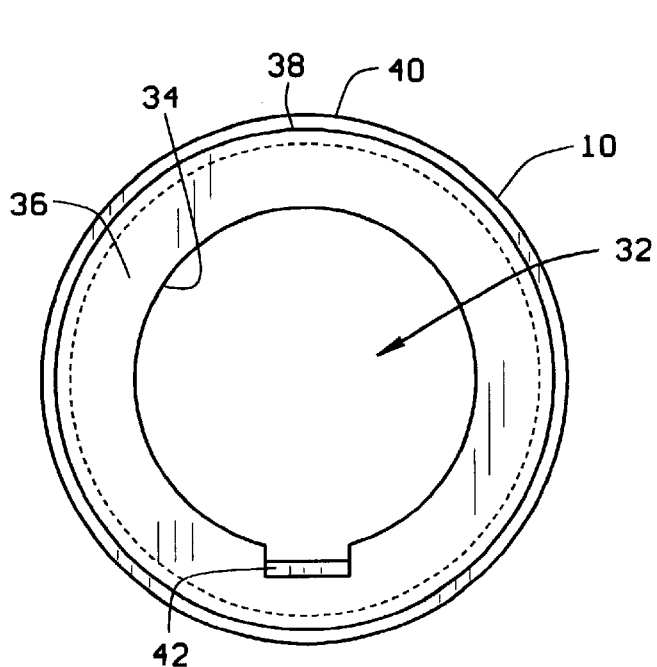
FIG. 2 in a plan view of the prior art bearing retainer of FIG. 1.
Figure 3:
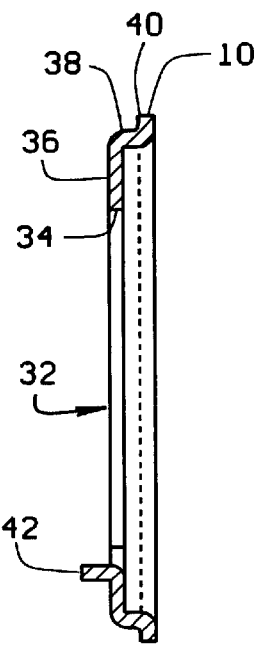
FIG. 3 is a side, sectioned view of the prior art bearing retainer of FIG. 1.

The bearing retainer 46 of the invention has a construction that is similar to that of the prior art bearing retainer 10. Like the prior art bearing retainer, the bearing retainer 46 of the invention is also stamped from sheet metal. The bearing retainer 46 is formed with a center hole 48 that is defined by a segmented, circular inner edge 50 of the retainer. The circle defined by the segmented inner edge 50 of the retainer is dimensioned with a diameter sufficiently large to enable the bearing retainer to slide easily over the shaft on which the bearing assembly is to be mounted. However, as with the prior art bearing retainer, the center hole is not larger than the C-ring. Radially outside the segmented inner edge 50, the bearing retainer has a planar ring portion 52. The ring portion 52 has axially opposite surfaces that are, for the most part, planar with certain exceptions to be described. Outside the ring portion 52 the bearing retainer has an annular flange 54 that projects axially from the outer edge of the ring 52 and is substantially identical to the annular flange of the prior art retainer. As with the prior art retainer, the annular flange 54 is turned radially outwardly at the outer perimeter edge 56 of the bearing retainer and adds strength to the retainer. The bearing retainer is also provided with an axially projecting key 58.

Figure 4:
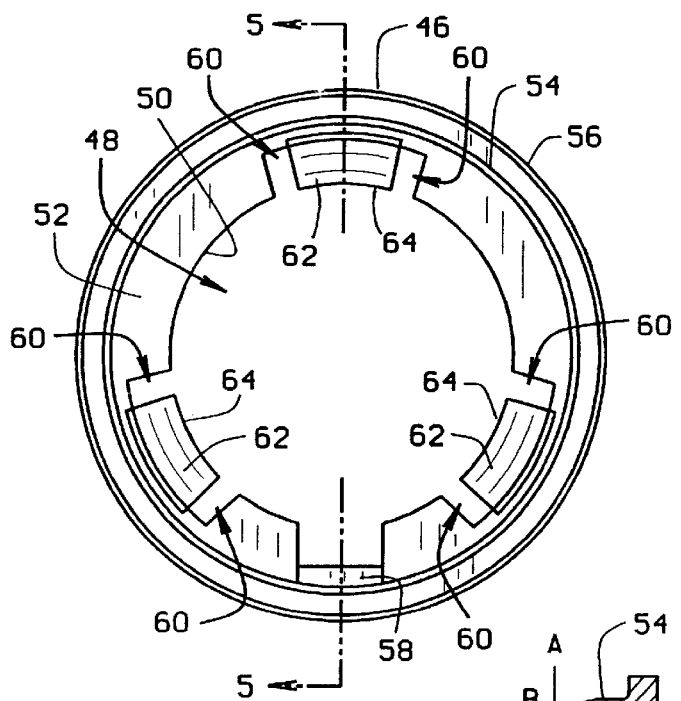
FIG. 4 is a plan view of the bearing retainer of the invention.
Figure 5:
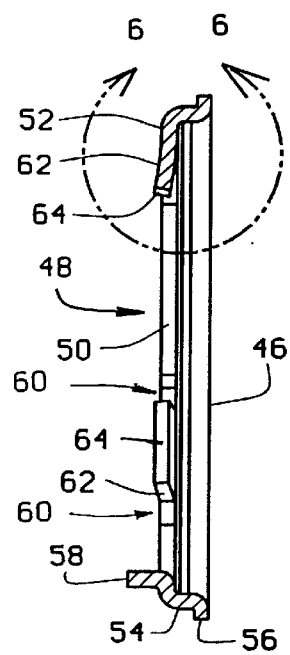
FIG. 5 is a side, sectioned view of the bearing retainer of FIG. 4.

The construction of the bearing retainer 46 differs from that of the prior art retainer in that it has pairs of notches 60 formed into the ring 52 of the retainer. As best seen in FIG. 4, the pairs of notches 60 segment the retainer inner edge 50 and extend radially outwardly from the inner edge 50 and center hole 48 of the retainer and stop short of the annular flange 54 of the retainer. In the preferred embodiment of the invention, there are three pairs of notches 60 spatially arranged around the center hole 48 of the retainer as seen in FIG. 4.

Figure 6:
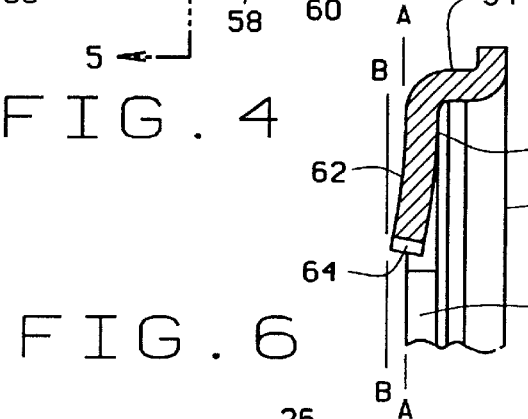
FIG. 6 is an enlarged, partial view of the bearing retainer of FIG. 4.

Each of the pairs of notches 60 formed into the retainer ring 52 defines a compliant tab 62 positioned between the notches of each pair. Thus, in the preferred embodiment of the invention, there are three compliant tabs 62. The tabs formed by the notches extend in a radial direction from adjacent the retainer annular flange 54 to distal ends 64 of the tabs that, together with the segmented inner edge 50 of the retainer ring define the center hole 48 of the retainer. As best seen in FIG. 6, each of the tabs 62 is bent slightly so that it angles out of a plane defined by the retainer ring 52 and the notches 60 formed in the ring. In FIG. 6, the line A—A represents the plane in which both the planar surface of the ring 52 and the notches 60 lie. Of course, the plane A—A is on the left side of the ring 52 or the side from which the tabs 62 project, and there is a parallel plane on the right side of the ring 52. The line B—B in FIG. 6 represents a plane into which the distal ends 64 of the tabs 62 project. The plane B—B is also parallel to the plane A—A. The angle that the tabs 62 project from the planar surface of the retainer ring 52 is very small, clearly less than 45° or 30°. In the preferred embodiment, the angle of the tabs 62 positions the distal ends 64 of the tabs at a spacing of 0.010 to 0.015 of an inch from the plane A—A. Stated another way, the spacing between the parallel planes A—A and B—B is 0.010 to 0.015 of an inch. Depending on the desired amount of end play between the metal washer and the bearing, the spacing could be changed by angling the tabs more or less.

Figure 7:
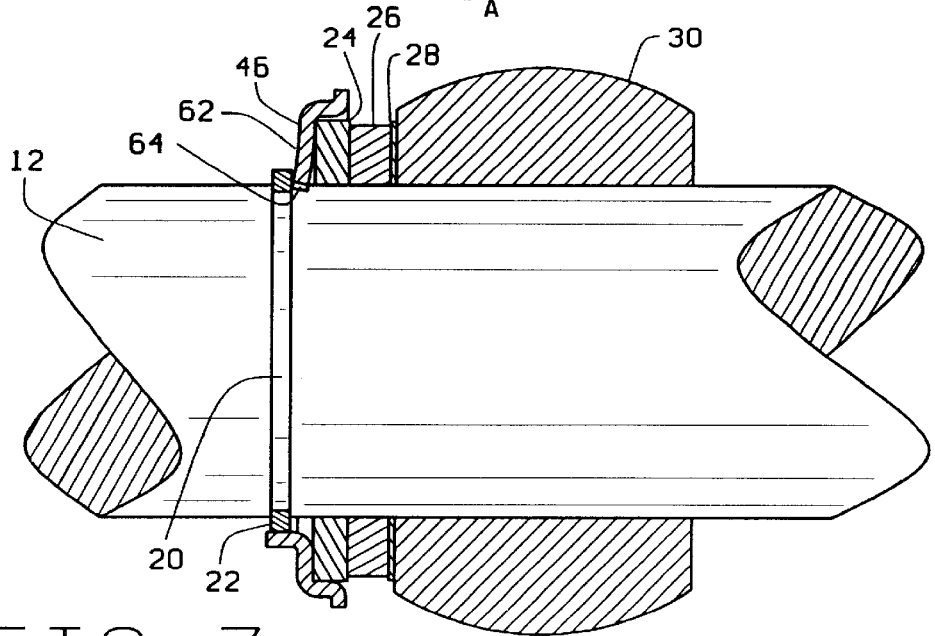
FIG. 7 is a partial, side sectioned view of the bearing retainer of FIG. 4 in its operative environment.

The bearing retainer 46 is assembled onto the motor shaft 12 in much the same manner as the prior art bearing retainer. As shown in FIG. 7, the C-ring 22 is first mounted on the exterior of the shaft engaging in the annular groove 20. The bearing retainer 46 is next mounted on the shaft and moved into abutment against the C-ring 22. The tabs 62 formed in the bearing retainer are positioned so that they engage with the C-ring 22 mounted on the shaft. The rubber washer 24, the phenolic washer 26 and the metal washer 28 are then mounted in succession on the shaft. The bearing 30 is next mounted on the shaft in its position shown in FIG. 7. As can be seen in FIG. 7, the angled orientations of the bearing retainer tabs 62 provide a small axial gap between the C-ring 22 and the planar surface of the bearing retainer ring 52. With the particular angled orientation of the tabs 62, the axial spacing between the C-ring and the retainer ring surface is 0.010 to 0.015 of an inch.

The assembly of the shaft 12 into the housing sections or end bells of the motor then takes place in the same manner as was done in assembling prior art motors. Again, the assembler exerts an axial force on the two housing halves or two end bells of the motor enclosure urging them toward each other. This presses the bearing 30, the washers 24, 26, 28 and the bearing retainer 46 between one of the housing end bells and the C-ring 22 mounted on the shaft in the same manner as was done in the prior art assembly of the motor. The motor halves are then epoxied and the epoxy is cured completing the assembly of the motor. With the particular construction of the bearing retainer 46, the axial force exerted by an assembler when pressing the bearing, the washers and the bearing retainer between one of the housing end bells and the C-ring mounted on the shaft in assembling the two end bells together would not be sufficient to deform the tabs 62. In addition, the axial force created by the shrinking of the epoxy as it is cured causing the two motor end bells to move toward each other is also insufficient to deform the tabs 62 from their angled orientations. In the preferred embodiment of the bearing retainer the axial force of at least 200 and preferably 250 lbs. is required to deform the tabs 62 from their angled orientations. This prevents the assembler of the electric motor and the subsequent shrinkage of the epoxy holding the two motor end bells together from deforming the tabs 62 and creating the situation where there is negative end play or no end play between the C-ring 22, the retainer 46, the washers 24, 26, 28 and the bearing 30.

However, the construction of the bearing retainer 46 enables a subsequent step to the assembly of the motor to ensure that there is end play between these component parts. The motor, upon completion of its assembly, is positioned on end so that its shaft center axis 18 extends vertically. The motor is supported on the end bell 16 with the shaft suspending from the end bell. A load of at least 200 lbs. and preferably 250 lbs. is then exerted on the top end of the shaft 12. The load causes the compliant tabs 62 formed in the bearing retainer 46 to be bent by the C-ring from their angled orientations back into the plane A—A of the bearing retainer ring 52 and the ring notches 60. Because the angled orientation of the tabs positions their distal ends 64 from 0.010 inches to 0.015 inches out of the plane A—A of the retainer ring and the plane of the ring notches, exerting the axial load on the shaft that forces the bearing tabs 62 back into the plane A—A creates an end play in the component parts of the bearing assembly of from 0.010 inches to 0.015 inches. In this manner, the bearing retainer 46 ensures that there will always be end play between the component parts of the bearing assembly, and in particular the metal washer 28 and the powdered metal bearing 30, regardless of how the motor shaft is assembled into the end bells or housing sections of the motor.

While the present invention has been described by reference to a specific embodiment, it should be understood that modifications and variations of the invention may be constructed without departing from the scope of the invention defined in the following claims.

What is claimed:

1. A shaft mounted bearing retainer having a center hole with a circular inner edge that is to be mounted in sliding engagement on a rotatable shaft at one side of a bearing mounted on the shaft whereby the bearing retainer limits axial movement of the bearing relative to the shaft as the shaft rotates, an improvement comprising:

a ring having the center hole passing therethrough, the ring having a planar surface that surrounds the center hole and extends from a periphery of the ring to the circular inner edge of the center hole, the ring having a plurality of pliant tabs that project outwardly from the planar surface, the plurality of tabs are spatially arranged around the center hole and the planar surface has pairs of notches formed therein, and each tab is positioned between a pair of notches.

2. The bearing retainer of claim 1, wherein:

the tabs project outwardly at an angle relative to the planar surface.

3. The bearing retainer of claim 1, wherein:

the pairs of notches are positioned in a plane of the planar surface and the tabs project outwardly from the plane.

4. The bearing retainer of claim 1, wherein:

the ring has an outer perimeter edge and the tabs project outwardly from the ring in directions from the outer perimeter edge toward the center hole.

5. The bearing retainer of claim 1, wherein:

the ring is a metallic ring.

6. The bearing retainer of claim 1, wherein:

the pairs of notches divide the planar surface of the ring into a Plurality of separate arcuate segments of the planar surface.

7. A shaft mounted bearing retainer comprising:

a ring having a center hole defined by a circular inner edge of the ring, the inner edge has a pair of notches formed therein that extend radially outwardly from the inner edge, a pliant tab is positioned between the notches;

the pair of notches is one pair of a plurality of pairs of notches in the ring and the tab is one tab of a plurality of tabs on the ring, each tab is positioned between a pair of notches; and, the pairs of notches are positioned in a single plane.

8. The bearing retainer of claim 7, wherein:

each of the tabs projects outwardly from the planar surface at an angle of less than 45° from the planar surface.

9. The bearing retainer of claim 7, wherein:

the ring has a planar surface and the pairs of notches are positioned in the planar surface of the ring and divide the planar surface of the ring into co-planar arcuate segments of the planar surface between the pairs of notches.

10. A shaft mounted bearing retainer comprising:

a ring having a center hole passing therethrough, the ring having a planar surface that surrounds the center hole, and the ring having a pliant tab that projects outwardly from the planar surface;

the tab has a distal edge that is spaced outwardly from the ring planar surface by 0.010 to 0.015 of an inch; and, the ring planar surface has a plurality of tabs and a plurality of pairs of notches formed therein with each tab positioned between the notches of a pair of notches, and the pairs of notches divide the planar surface of the ring into planar arcuate segments of the planar surface between the pairs of notches.

11. A shaft mounted bearing retainer comprising:

a ring having a center hole defined by a circular inner edge of the ring, the inner edge has a pair of notches formed therein that extend radially outwardly from the inner edge, and a pliant tab is positioned between the notches, the pair of notches are positioned in a plane and the tab projects outwardly at an angle from the plane;

the tab has a distal edge that is spaced outwardly from the plane by 0.010 to 0.015 of an inch; and, the ring has a planar surface with a plurality of tabs and a plurality of pairs of notches formed therein with each tab positioned between the notches of a pair of notches, and the pairs of notches divide the planar surface of the ring into planar arcuate segments of the planar surface between the pairs of notches.

12. The bearing retainer of claim 11, wherein:

the ring is metallic.

13. A shaft mounted bearing retainer comprising:

a ring having a center hole defined by a circular inner edge of the ring, the inner edge has a pair of notches formed therein that extend radially outwardly from the inner edge, and a pliant tab is positioned between the notches, the pair of notches are positioned in a plane and the tab projects outwardly at an angle from the plane, the tab projects outwardly at an angle of less than 45° from the plane; and, the ring has a planar surface with a plurality of tabs and a plurality of pairs of notches formed therein with each tab positioned between the notches of a pair of notches, and the pairs of notches divide the planar surface of the ring into planar arcuate segments of the planar surface between the pairs of notches.

14. A method of assembling a bearing on a shaft between a bearing retainer and a housing end wall while ensuring end play between the bearing retainer and the bearing, the method comprising the steps of:

mounting a C-ring on the shaft;

mounting the bearing retainer on the shaft adjacent the C-ring, the bearing retainer having a compliant tab that projects outwardly from the bearing retainer toward the C-ring;

mounting the bearing on the shaft on an opposite side of the bearing retainer from the C-ring;

assembling the shaft in a housing with an end wall of the housing exerting a force on the bearing that urges the C-ring, the bearing retainer and the bearing together on the shaft; and exerting a force on the shaft that deforms the bearing retainer tab.

15. The method of claim 14, further comprising:

mounting at least one washer on the shaft between the bearing retainer and the bearing.

16. The method of claim 14, further comprising:

exerting a force on the shaft of at least 200 lbs. to deform the tab.

17. The method of claim 14, further comprising:

exerting the force on the shaft that deforms the bearing retainer tab after the assembly of the shaft in the housing is completed.

* * * * *